US008388482B2

(12) United States Patent
Honzek

(10) Patent No.: US 8,388,482 B2
(45) Date of Patent: Mar. 5, 2013

(54) POWER TAKE-OFF SHAFT ARRANGEMENT

(75) Inventor: Robert Honzek, Oberthingau (DE)

(73) Assignee: AGCO GmbH, Marktoberdorf (DE)

( * ) Notice: Subject to any disclaimer, the term of this patent is extended or adjusted under 35 U.S.C. 154(b) by 5 days.

(21) Appl. No.: 12/741,847

(22) PCT Filed: Oct. 24, 2008

(86) PCT No.: PCT/EP2008/009036
§ 371 (c)(1),
(2), (4) Date: May 7, 2010

(87) PCT Pub. No.: WO2009/059702
PCT Pub. Date: May 14, 2009

(65) Prior Publication Data
US 2010/0267507 A1    Oct. 21, 2010

(30) Foreign Application Priority Data
Nov. 8, 2007    (DE) .......................... 10 2007 053 321

(51) Int. Cl.
*F16H 37/08*    (2006.01)
(52) U.S. Cl. ....................................... 475/202; 180/53.1
(58) Field of Classification Search .................. 475/220, 475/221, 225, 230, 231, 248, 249; 74/11, 74/13, 14.4, 15.6; 180/53.6, 53.61, 53.62
See application file for complete search history.

(56) References Cited

U.S. PATENT DOCUMENTS

| | | | |
|---|---|---|---|
| 2,207,882 A | | 7/1940 | Wasserman |
| 4,612,824 A | * | 9/1986 | Ruhle ............................. 475/204 |
| 4,726,254 A | * | 2/1988 | Kubo et al. ................... 74/665 T |
| 4,779,699 A | * | 10/1988 | Hatano ........................... 180/248 |
| 5,269,732 A | * | 12/1993 | Weiss et al. .................... 475/249 |
| 5,704,443 A | * | 1/1998 | Janiszewski .................. 180/247 |
| 6,419,041 B1 | | 7/2002 | Nemoto |
| 7,331,896 B1 | * | 2/2008 | Kroppe ........................... 475/221 |
| 7,575,529 B2 | * | 8/2009 | Holmes ............................. 475/5 |
| 2003/0109347 A1 | * | 6/2003 | Weeramantry .................. 475/72 |
| 2008/0125268 A1 | * | 5/2008 | Janson ............................ 475/207 |

FOREIGN PATENT DOCUMENTS

| | | |
|---|---|---|
| DE | 956649 | 1/1957 |
| DE | 1103669 | 4/1960 |
| DE | 3439710 C2 | 5/1986 |
| DE | 10208444 A1 | 9/2002 |
| EP | 1527933 A | 5/2005 |
| GB | 1157250 A | 7/1969 |
| WO | WO-02/28678 A | 4/2002 |

OTHER PUBLICATIONS

International Search Report for International Application No. PCT/EP2008/009036 dated May 2, 2009.
German Office Action for German Application No. 10 2007 053 321.9 dated May 19, 2008.

* cited by examiner

*Primary Examiner* — Ha D Ho
*Assistant Examiner* — Jude Agendia

(57) ABSTRACT

The invention relates to a groundspeed power take-off (PTO) shaft arrangement in a commercial agricultural vehicle. The groundspeed PTO shaft arrangement has a groundspeed PTO shaft device with a differential gear (222). The differential gear contains an input shaft (221) which is coupled to a gear (212). A right wheel output shaft (232) is coupled to an end drive (233) of a right wheel (234) and driven via the input shaft (221); a left wheel output shaft (239) is coupled to an end drive of a left wheel and is driven via the input shaft (221). Provided in this case is a first PTO shaft (236) which issues from the differential gear (222) relative to the input shaft (221), is driven by the input shaft (221) and is coupled to the right or left wheel output shaft (232, 239).

8 Claims, 2 Drawing Sheets

POWER TAKE-OFF SHAFT ARRANGEMENT

The invention relates to the arrangement of a power take-off shaft of a commercial agricultural vehicle and relates in particular to the arrangement of a groundspeed power take-off shaft of a farm tractor.

It is conventional for farm tractors to be provided in the rear region and/or in the front region with a respective power take-off (PTO) shaft. In this case, a distinction is drawn between engine speed PTO shafts, the rotational speed of which is proportional to the rotational speed of a drive engine speed, and groundspeed PTO shafts, the rotational speed of which is proportional to a distance covered by the vehicle or to a rotational speed of a drive axle. Engine speed PTO shafts are conventionally designed so as to be able to provide rotational speeds of 1,000 rpm, 750 rpm or 540 rpm.

The drive of the PTO shafts is usually configured as in FIG. 1. A drive motor 100 of a farm tractor, usually an internal combustion engine, transmits rotational speed and torque of its crank shaft to a PTO shaft coupling 101. By coupling in the PTO shaft coupling 101, a front PTO shaft stub 103 is driven via a step-up gear 102. The front PTO shaft stub is accordingly a engine speed front PTO shaft. The rotational speed and the torque of the drive motor 100 is further transmitted via a double coupling 104, on the one hand, to a control gear 105 for varying the wheel drive step-up and, on the other hand, to a PTO shaft step-up gear 106 for varying the rotational speed of a rear engine speed PTO shaft 107.

A rear PTO shaft stub 109 is driven via a step-up gear 108. The control gear 105 drives a rear drive train 110 which in turn drives both sides of a rear axle 115 via a bevel wheel differential 111. A rear groundspeed PTO shaft 113 is driven via the rear drive train 110 and a drive gear 112, said rear groundspeed PTO shaft driving in turn the rear PTO shaft stub 109 via a groundspeed PTO shaft coupling 114.

As may be seen from FIG. 1, the rear groundspeed PTO shaft 113 has to be guided past the bevel wheel differential 111. As a result, in a region which usually provides little space in the farm tractor owing to the large rear tyres, a large amount of space is taken up for guiding the rear PTO shaft 113 and the engine speed rear PTO shaft 107, which space is available only to a highly limited extent and must be shared with other devices such as a spring suspension or compressed air reservoirs.

It is the object of the invention to provide a groundspeed PTO shaft drive train which solves this problem from the prior art. In particular, it is the object of the invention to provide a groundspeed PTO shaft drive train requiring no additional space perpendicularly to the drive shaft.

This object is achieved by a PTO shaft device according to claim 1. Advantageous developments form the subject-matter of the sub-claims.

A PTO shaft arrangement allows direct through-drive of the groundspeed PTO shaft drive train by the rear axle differential. As a result of the fact that the groundspeed PTO shaft can be driven by the rear axle differential, it does not have to be guided past the rear axle differential, so that no additional space has to be taken up in this extension.

The invention will be described hereinafter based on an exemplary embodiment and with reference to FIG. 2. In the drawings:

FIG. 2 shows parts of a drive train of a farm tractor and drive devices for a front engine speed PTO shaft, a rear engine speed PTO shaft and a rear groundspeed PTO shaft.

Figure 1:
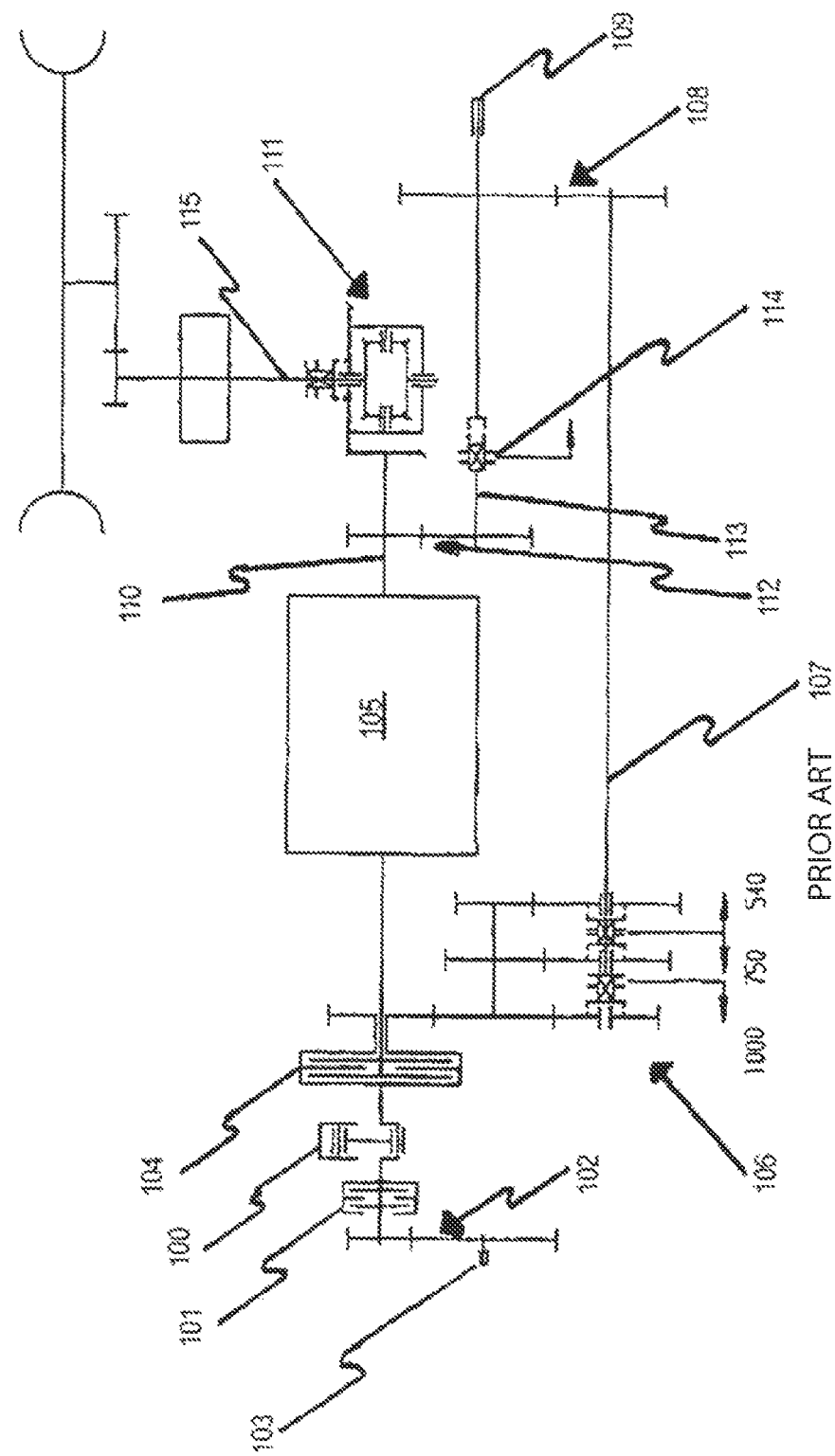
FIG. 1 shows a drive train with engine speed PTO shafts and a rear PTO shaft from the prior art.
Figure 2:
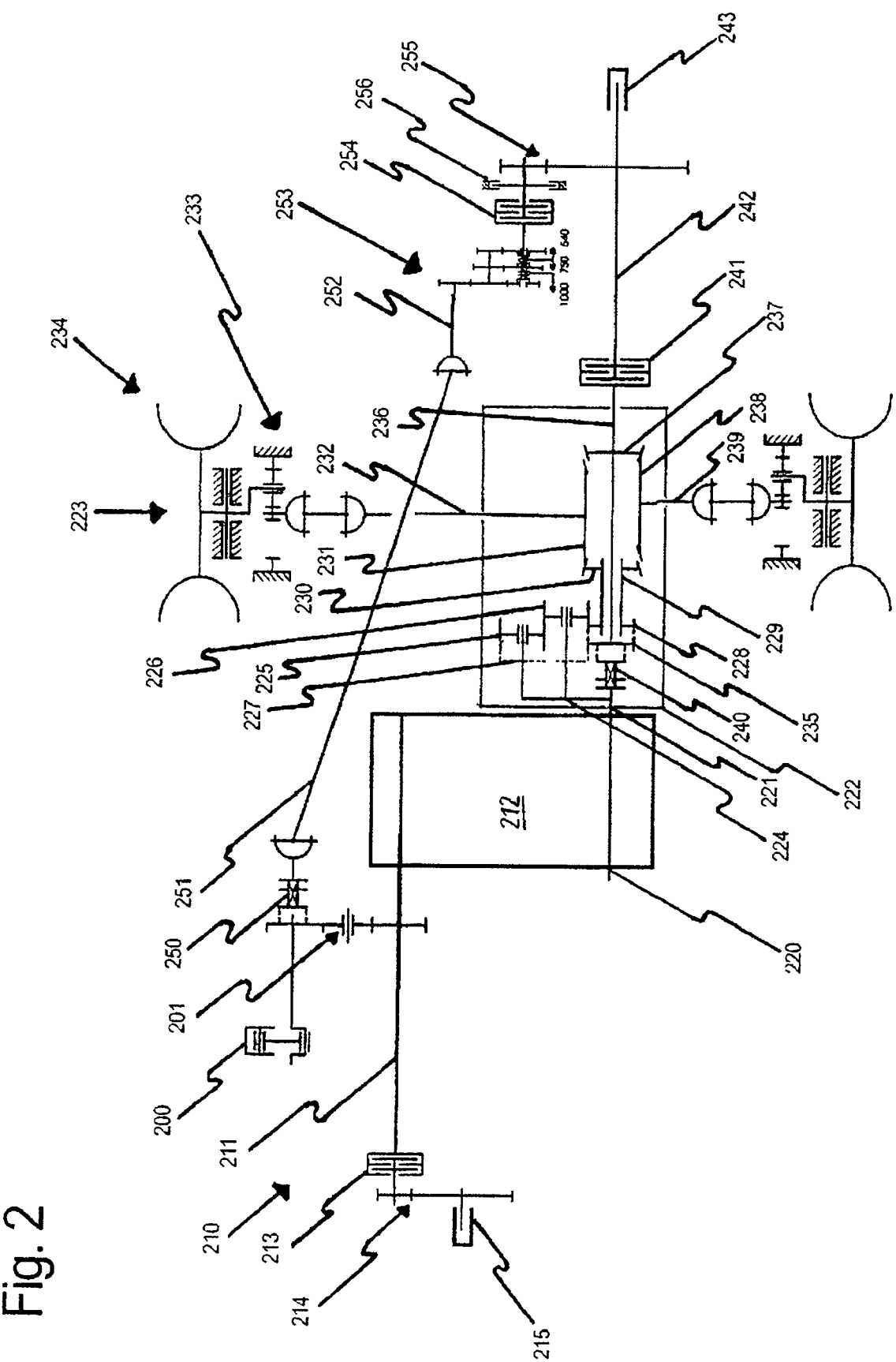
FIG. 2 shows an exemplary embodiment of a drive train according to the invention with engine speed PTO shafts and a rear PTO shaft.

Power issued by a drive motor 200 in the form of rotational speed and torque is transmitted to a front engine speed PTO shaft drive train 210 via an intermediate wheel gear 201. In this case, the intermediate wheel gear 201 is configured in such a way that the output direction of rotation, output power and output rotational speed correspond to the input direction of rotation, input power and input rotational speed.

The drive train of a front engine speed PTO shaft will be described hereinafter.

The front engine speed PTO shaft drive train 210 is configured in such a way that a gear input shaft 211, which transmits at one end rotational speed and torque to a control gear 212 for the wheel drive of the farm tractor, is driven via the intermediate wheel gear 201. At the other end, the gear input shaft 211 is coupled to a front engine speed PTO shaft coupling 213. By closing the front engine speed PTO shaft coupling 213, a front engine speed PTO shaft stub 215 is driven via a front engine speed PTO shaft gear 214. The front engine speed PTO shaft coupling 213 is configured so as to prevent, on disengagement, overrun of the front engine speed PTO shaft gear 214, so that an additional PTO shaft brake can be dispensed with.

The front engine speed PTO shaft gear 214 is configured so as to provide on the front engine speed PTO shaft stub 215 at optimum engine speed a fixed rotational speed, generally 1,000 rpm. Exchanging the front engine speed PTO shaft gear 214 allows further conventional rotational speeds of 750 rpm and 540 rpm to be provided.

The drive train of a rear groundspeed PTO shaft will be described hereinafter.

The control gear 212, to which rotational speed and torque are transmitted via the gear input shaft 211, transmits the rotational speed and the torque, if appropriate with variation, to a control gear output shaft 220. The control gear output shaft 220, which also drives a front axle drive train (not shown), is part of a rear axle drive train and coupled in a rotationally fixed manner to an input shaft 221 of a differential gear 222 for a rear axle 223 directly or via an intermediate shaft.

The differential gear 222 is what is known as a spur wheel differential gear in which, in contrast to a bevel wheel differential gear, power is distributed to a right and a left part of the rear axle 223 via a planetary gear lying coaxially with the input shaft 221. In this case, a planet carrier 224 is connected to the input shaft 221 in a rotationally fixed manner. The planet carrier 224 carries in this case at least a first planetary wheel set 225, at least a second planetary wheel set 226 and at least a third planetary wheel set 227.

In this exemplary embodiment, two respective planetary wheels are fitted per planetary wheel set, only one planetary wheel being shown in the figures for each planetary wheel set. The first planetary wheel set 225 is engaged with the second planetary wheel set 226 and the third planetary wheel set 227 with the first planetary wheel set 225 so as to cause rotation of the second planetary wheel set 226 in inverted rotation of the third planetary wheel set 227. The second planetary wheel set 226 is engaged with a first sun wheel 228 which is connected to a first differential shaft 229 in a rotationally fixed manner.

The first differential shaft 229 is a hollow shaft and connected to a first bevel wheel 230 in a rotationally fixed manner. The first bevel wheel 230 drives a right output shaft 232 via a second bevel wheel 231. The right output shaft 232 is connected to a right rear wheel 234 via an end drive planetary gear 233 and drives said right rear wheel. The third planetary wheel set 227 is engaged with a second sun wheel 235.

A second differential shaft 236 is mounted within the first differential shaft 229, which is configured as a hollow shaft as mentioned above, and connected to the second sun wheel 235 and a third bevel wheel 237 in a rotationally fixed manner. The third bevel wheel 237 drives a left output shaft 239 via a fourth bevel wheel 238. The left output shaft 239 is connected to a left rear wheel in a comparable manner to the right output shaft 232.

A differential lock 240 can be used to couple the input shaft 221 to the second differential shaft 236 in a rotationally fixed manner, thus compelling running of the right output shaft 232 in synchronisation with the left output shaft 239. A rear groundspeed PTO shaft coupling 241 is also coupled in a rotationally fixed manner to the second differential shaft 236 which was for this purpose guided out a via the third bevel wheel 237 and thus also forms a rear groundspeed PTO shaft (having the same reference numeral) 236.

The differential gear 222 of the rear axle is accordingly configured in such a way that the second differential shaft, as the rear groundspeed PTO shaft 236, is aligned axially with the input shaft 221 on one side from the differential gear 222 lying opposite the input shaft 221. In addition, it is possible to provide in this configuration the rear axle 223 as a floating half-axle which is a more cost-effective alternative to single-wheel suspension.

By closing the rear groundspeed PTO shaft coupling 241, power is transmitted to a rear PTO shaft 242 which is coupled to a rear PTO shaft stub 243 in a rotationally fixed manner. In this case, the rear groundspeed PTO shaft coupling 241 is configured so as to prevent overrun, thus obviating the need for a PTO shaft brake.

The drive train of a rear engine speed PTO shaft will be described hereinafter.

Via a first rear engine speed PTO shaft coupling 250, rotational speed and torque of the drive motor 200 can be transmitted to a rear engine speed PTO shaft 252 via a cardan shaft 251. The first rear engine speed PTO shaft coupling 250 is provided in order, in the event of extended non-utilisation of the rear engine speed PTO shaft 252, permanently to separate the complete drive train of the rear engine speed PTO shaft 252 from the motor in order to minimise the power loss which would occur as a result of the driven but not required drive train of the rear engine speed PTO shaft 252. Instead of the cardan shaft 251, an intermediate wheel gear with two shafts can also be provided.

The rear engine speed PTO shaft 252 is at the same time the input shaft for a rear engine speed PTO shaft control gear 253 which is configured to allow rotational speeds of 1,000 rpm, 750 rpm and 540 rpm to be applied to the rear PTO shaft stub 243. The output shaft of the rear engine speed PTO shaft control gear 253 is coupled to a second rear engine speed PTO shaft coupling 254. By closing the second rear engine speed PTO shaft coupling 254, the rotational speed and the torque of the output shaft of the rear engine speed PTO shaft control gear 253 can be transmitted to the rear PTO shaft 242 and thus to the rear PTO shaft stub 243 via a rear PTO shaft gear 255.

A rear PTO shaft brake 256 is provided between the second rear engine speed PTO shaft coupling 254 and the rear PTO shaft gear 255 for stopping the rear PTO shaft 242. Overrun both by the rear engine speed PTO shaft 252 and by the rear groundspeed PTO shaft 235 can be prevented via the rear PTO shaft brake 256.

It will be obvious to a person skilled in the art that modifications of this exemplary embodiment are possible without departing from the scope of protection of the invention. Thus, it is for example possible to provide a front groundspeed PTO shaft via a corresponding front axle differential according to the invention. In this case too, the cooler arrangement and the engine speed unit in particular place tight restrictions on the space for the installation of front PTO shafts, which restrictions can be avoided by a groundspeed PTO shaft according to the invention.

In addition, it is possible to arrange the rear engine speed PTO shaft control gear 253 after the second rear engine speed PTO shaft coupling 254 and to combine it with the rear PTO shaft gear 255. It is also possible to dispense with the rear engine speed PTO shaft control gear 253 altogether and to provide only one of the conventional engine speed PTO shaft rotational speeds at the rear PTO shaft stub.

Furthermore, shafts producing a drive connection can optionally be embodied as a rigid shaft or as a cardan shaft.

The invention claimed is:

1. An agricultural vehicle PTO driveline having an input (221) driven by a drive motor (200), the input driving a carrier (224) of a planetary differential (222), the carrier carrying two planetary gear trains with separate co-axial output elements (228,235), one output element (228) driving a right or left wheel drive shaft (232,239) of the vehicle and the other output element (235) driving the left or right wheel drive shaft (239, 232) of the vehicle and also driving a first PTO shaft (236) coaxial with the input (221).

2. A PTO driveline according to claim 1, wherein the first PTO shaft (236) is coupled to a bevel gear-wheel (237) which drives the right or left wheel output shaft (232, 239).

3. A PTO driveline according to claim 1, wherein the first PTO shaft (236) is coupled to a rear PTO shaft output stub (243) via a first PTO shaft coupling (241) and via a second PTO shaft (242) coaxial with the first PTO shaft (236).

4. A PTO driveline according to claim 1, wherein the first PTO shaft (236) is guided by a drive shaft (229) which carries said one output element (228) and is configured as a hollow shaft which carries a further bevel gear (238) which drives the left or right wheel output shaft (239, 232).

5. A PTO driveline according to claim 3, wherein the second PTO shaft (242) is connected to the drive motor (200) via a gear (255) and an engine speed PTO shaft drive train (250, 251, 252, 253, 254, 256).

6. A PTO driveline according to claim 5, wherein the engine speed PTO shaft drive train includes an engine speed PTO shaft control gear (253), an engine speed PTO shaft coupling (254) and/or a PTO shaft brake (256).

7. An agricultural vehicle PTO driveline having an input (221) driven by a drive motor (200), the input driving a carrier (224) of a planetary differential (222), the carrier carrying two planetary gear trains with separate co-axial output elements (228,235), one output element (228) driving a right or left wheel drive shaft (232,239) of the vehicle and the other output element (235) driving the left or right wheel drive shaft (239, 232) of the vehicle and also driving a first PTO shaft (236) coaxial with the input (221), wherein the first PTO shaft (236) is coupled to a rear PTO shaft output stub (243) via a first PTO shaft coupling (241) and via a second PTO shaft (242) coaxial with the first PTO shaft (236), and wherein the second PTO shaft (242) is connected to the drive motor (200) via a gear (255) and an engine speed PTO shaft drive train (250, 251, 252, 253, 254, 256).

8. A PTO driveline according to claim 7, wherein the engine speed PTO shaft drive train includes an engine speed PTO shaft control gear (253), an engine speed PTO shaft coupling (254) and/or a PTO shaft brake (256).

* * * * *